(12) United States Patent
Cowden et al.

(10) Patent No.: US 9,032,732 B1
(45) Date of Patent: May 19, 2015

(54) HIGH EFFICIENCY OTEC SERVICE STATION

(76) Inventors: David H. Cowden, Katy, TX (US); Era W. Cowden, Katy, TX (US)

( * ) Notice: Subject to any disclaimer, the term of this patent is extended or adjusted under 35 U.S.C. 154(b) by 186 days.

(21) Appl. No.: 13/323,899

(22) Filed: Dec. 13, 2011

Related U.S. Application Data

(63) Continuation-in-part of application No. 13/074,171, filed on Mar. 29, 2011, now Pat. No. 8,572,967.

(60) Provisional application No. 61/431,462, filed on Jan. 11, 2011, provisional application No. 61/435,588, filed on Jan. 24, 2011.

(51) Int. Cl.
| | |
|---|---|
| *F03G 7/04* | (2006.01) |
| *F03G 7/06* | (2006.01) |
| *F01K 27/00* | (2006.01) |
| *F03G 7/00* | (2006.01) |
| *F03G 7/05* | (2006.01) |

(52) U.S. Cl.
CPC .. *F03G 7/04* (2013.01); *F03G 7/05* (2013.01); *F17C 2265/05* (2013.01); *Y02E 10/34* (2013.01); *Y02E 10/10* (2013.01)

(58) Field of Classification Search
CPC ......... Y02E 10/34; Y02E 10/14; Y02E 10/28; Y02E 10/32; Y02E 10/38; Y02E 10/46; Y02E 10/72; F03G 7/05; F03G 7/04; B63B 35/44
USPC ................................ 60/641.1–641.7; 114/264
See application file for complete search history.

(56) References Cited

U.S. PATENT DOCUMENTS

| | | | | |
|---|---|---|---|---|
| 1,952,520 | A | * | 3/1934 | Urquhart .......................... 165/97 |
| 3,312,054 | A | * | 4/1967 | Anderson et al. ............... 60/531 |
| 3,708,991 | A | * | 1/1973 | Barkley ......................... 405/194 |
| 4,055,145 | A | | 10/1977 | Mager |
| 4,110,628 | A | * | 8/1978 | Paull et al. ..................... 290/1 R |
| 4,170,878 | A | * | 10/1979 | Jahnig .......................... 60/641.7 |
| 4,189,647 | A | * | 2/1980 | Wittig .............................. 290/42 |
| 4,224,891 | A | * | 9/1980 | Rinaldi ......................... 114/256 |
| 4,249,383 | A | * | 2/1981 | Molini et al. ................. 60/641.7 |
| 4,302,682 | A | * | 11/1981 | LaCoste ......................... 290/1 R |
| 4,311,012 | A | * | 1/1982 | Finley ........................... 60/641.7 |
| 4,312,288 | A | * | 1/1982 | Finsterwalder et al. ..... 60/641.7 |
| 4,346,561 | A | | 8/1982 | Kalina |
| 4,350,014 | A | * | 9/1982 | Sanchez et al. .............. 60/641.7 |
| 4,372,126 | A | | 2/1983 | Sebald |
| 4,373,338 | A | * | 2/1983 | van der Pot .................. 60/641.7 |

(Continued)

*Primary Examiner* — Kenneth Bomberg
*Assistant Examiner* — Daniel Wagnitz
(74) *Attorney, Agent, or Firm* — Neustel Law Offices

(57) ABSTRACT

A high efficiency OTEC service station for supporting a novel high efficiency ocean thermal energy conversion system. The high efficiency OTEC service station generally includes a semi-submersible platform positioned in a warm ocean location. The station includes an upper deck having an interior which stores one or more fluid pumps, generators and turbines for use in generating electrical power. A lower deck having an interior stores one or more working fluid tanks, water storage tanks and spent working fluid tanks. Three heater assemblies are provided for heating working fluid at various stages of an OTEC cycle and for use in creating potable water for other applications. A heat exchanger extends from the lower deck, which also includes one or more buoyancy tanks. By utilizing a novel approach to ocean thermal energy conversion, the OTEC service station achieves greater efficiency and lower operating costs than prior art systems.

14 Claims, 10 Drawing Sheets

(56) References Cited

U.S. PATENT DOCUMENTS

| | | | | |
|---|---|---|---|---|
| 4,422,799 A * | 12/1983 | Green et al. | | 405/158 |
| 4,468,568 A * | 8/1984 | Carr et al. | | 290/1 R |
| 4,537,030 A * | 8/1985 | Berman | | 60/641.7 |
| 4,742,682 A * | 5/1988 | Assaf et al. | | 60/641.1 |
| 5,009,069 A * | 4/1991 | Molini | | 60/641.1 |
| 5,263,322 A * | 11/1993 | Molini | | 60/398 |
| 5,513,494 A | 5/1996 | Flynn | | |
| 5,685,147 A * | 11/1997 | Brassea | | 60/496 |
| 6,510,687 B1 * | 1/2003 | Zaslavsky et al. | | 60/398 |
| 7,328,578 B1 * | 2/2008 | Saucedo | | 60/641.1 |
| 8,424,306 B2 * | 4/2013 | Prueitt | | 60/641.1 |
| 2002/0017108 A1 * | 2/2002 | Schooley | | 62/240 |
| 2005/0198960 A1 * | 9/2005 | Marnoch | | 60/645 |
| 2006/0137349 A1 * | 6/2006 | Pflanz | | 60/641.2 |
| 2007/0289303 A1 | 12/2007 | Prueitt | | |
| 2008/0156731 A1 | 7/2008 | Gordon | | |
| 2009/0077969 A1 * | 3/2009 | Prueitt | | 60/641.7 |
| 2009/0158986 A1 * | 6/2009 | Kim et al. | | 114/256 |
| 2009/0293724 A1 * | 12/2009 | Ivison | | 95/288 |
| 2010/0251714 A1 * | 10/2010 | Prueitt | | 60/670 |
| 2011/0061383 A1 * | 3/2011 | Mcalister | | 60/641.7 |
| 2011/0064644 A1 * | 3/2011 | Mcalister | | 423/445 R |
| 2011/0120126 A1 * | 5/2011 | Srinivasan | | 60/641.7 |

* cited by examiner

HIGH EFFICIENCY OTEC SERVICE STATION

CROSS REFERENCE TO RELATED APPLICATIONS

I hereby claim benefit under Title 35, United States Code, Section 120 of U.S. patent application Ser. No. 13/074,171 filed Mar. 29, 2011 now U.S. Pat. No. 8,572,967. This application is a continuation-in-part of the Ser. No. 13/074,171 application. The Ser. No. 13/074,171 application is currently pending. The Ser. No. 13/074,171 application is hereby incorporated by reference into this application.

I hereby claim benefit under Title 35, United States Code, Section 119(e) of U.S. provisional patent application Ser. No. 61/431,462 filed Jan. 11, 2011. The 61/431,462 application is hereby incorporated by reference into this application.

I hereby claim benefit under Title 35, United States Code, Section 119(e) of U.S. provisional patent application Ser. No. 61/435,588 filed Jan. 24, 2011. The 61/435,588 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a semi-submersible platform and more specifically it relates to a high efficiency OTEC service station for supporting a novel high efficiency ocean thermal energy conversion system.

2. Description of the Related Art

Any discussion of the related art throughout the specification should in no way be considered as an admission that such related art is widely known or forms part of common general knowledge in the field.

Systems for the production of energy using ocean thermal energy conversion (OTEC) have been in use for years. The need for such OTEC systems for energy production has increased in recent years due to an increased worldwide demand for energy in combination with the uncertainty of oil prices and the inherent dangers of harvesting nuclear energy.

Conventional closed-cycle OTEC systems pump warm surface seawater through a heat exchanger to vaporize working fluid. Cold water pumped through a second heat exchanger acts to condense the vaporized working fluid into a liquid, which is recycled through the system. The use of multiple heat exchangers in such conventional systems are both expensive to install and difficult to maintain. By providing an OTEC system which does not utilize multiple heat exchangers, significant cost savings may be realized. Further, existing systems tend to disregard the significant amount of potable water which may be easily produced as a by-product of such OTEC systems.

Because of the inherent problems with the related art, there is a need for a new and improved high efficiency OTEC service station for supporting a novel high efficiency ocean thermal energy conversion system.

BRIEF SUMMARY OF THE INVENTION

The invention generally relates to a OTEC service station which includes a semi-submersible platform positioned in a warm ocean location. The station includes an upper deck having an interior which stores one or more fluid pumps, generators and turbines for use in generating electrical power. A lower deck having an interior stores one or more working fluid tanks, water storage tanks and spent working fluid tanks. Three heater assemblies are provided for heating working fluid at various stages of an OTEC cycle and for use in creating potable water for other applications. A heat exchanger extends from the lower deck, which also includes one or more buoyancy tanks. By utilizing a novel approach to ocean thermal energy conversion, the OTEC service station achieves greater efficiency and lower operating costs than prior art systems.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
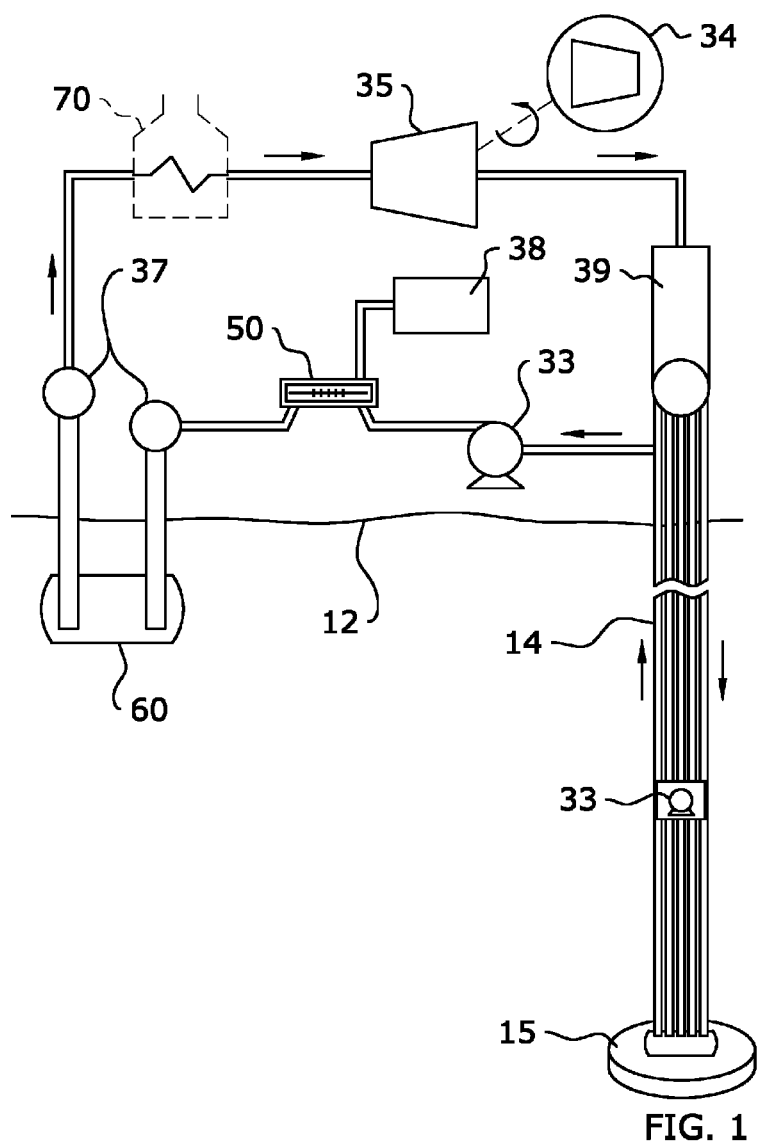
FIG. 1 is a block diagram illustrating the process of the present invention.

Turning now descriptively to the drawings, in which similar reference characters denote similar elements throughout the several views, FIGS. 1 through 10 illustrate a high efficiency OTEC service station 10, which comprises a semi-submersible platform positioned in a warm ocean location. The station 10 includes an upper deck 20 having an interior 30 which stores one or more fluid pumps 33, generators 34 and turbines 35 for use in generating electrical power. A lower deck 40 stores one or more working fluid tanks 37, water storage tanks 38 and spent working fluid tanks 39. Three heater assemblies 50, 60, 70 are provided for heating working fluid at various stages of an OTEC cycle and for use in creating potable water for other applications. A heat exchanger 14 extends from the lower deck 40, which also includes one or more buoyancy tanks 42. By utilizing a novel approach to ocean thermal energy conversion, the OTEC service station 10 achieves greater efficiency and lower operating costs than prior art systems.

B. Ocean Thermal Energy Conversion System

The present invention is directed toward a service station 10 comprised of a semi-submersible platform which supports a new, high efficiency ocean thermal energy conversion system. The ocean thermal energy conversion system utilized in combination with the service station 10 claimed herein is described in co-pending U.S. patent application Ser. No. 13/074,171 covering a "High Efficiency OTEC System", which is incorporated by reference. FIG. 1 illustrates an exemplary block diagram of the components of the ocean thermal energy conversion system which is utilized in combination with the present invention.

As shown in FIG. 1, the OTEC system utilized in the present invention utilizes a closed loop cycle with a working fluid such as ammonia. After expanding in the turbine 35, the working fluid will be in a low pressure vapor state and will flow into the spent working fluid tank 39 via a conduit. The working fluid will then enter the heat exchanger 14 of the present invention. The working fluid will travel to the depths of the ocean via condenser conduits of the heat exchanger 14. As the working fluid travels down into the depths of the ocean, it will be cooled and condensed into a liquid form. The working fluid will enter the cold fluid reservoir 15 located at the lower end of the heat exchanger 14 for further cooling before returning to the ocean surface 12 via an return conduit of the heat exchanger 14. A fluid pump 33 positioned within the heat exchanger 14 may be utilized to provide the requisite force to transfer the liquid working fluid back to the ocean surface. The return conduit may surrounded by insulation to prevent heating of the cooled liquid working fluid. The fluid pump 33 positioned within or adjacent the lower end of the heat exchanger 14 will provide the force to draw the working fluid up the length of the return conduit.

The liquid working fluid will exit the fluid heat exchanger 14 and be transferred to a second fluid pump 33. The pump 33 will act to pressurize the liquid working fluid before it is transferred to the first heater assembly 50. The first heater assembly 50 will utilize warm air collected via the fans 22 of the present invention to heat the working fluid as it passes therethrough. Potable water created via condensations during the warming by the first heater assembly 50 may be collected into a separate water storage tank 38 for use in other applications.

After passing through the first heater assembly 50, the warmed heating fluid will be passed through a second heater assembly 60, which will act to heat the working fluid into a vapor form by utilizing the warm water temperature near the ocean surface 12. The vaporized working fluid will exit the second heater 60 and be transferred to a third heater assembly 70. The third heater assembly 70 will utilize heat absorbed by the roof 21 to heat water, which is then heat exchanged with the working fluid.

After exiting the third heater assembly 70, the working fluid will pass into one or more working fluid tanks 37 before being directed to a turbine 35, where the working fluid will be expanded to generate electrical power via a generator 52. The spent working fluid is then transferred out of the turbine 35 and into the spent working fluid tank 39, and the cycle will repeat itself.

C. Semi-Submersible Platform

The high efficiency OTEC service station 10 is generally comprised of a semi-submersible platform which is positioned in warm ocean temperatures. While the figures illustrate an exemplary structure for the platform, it is appreciated that various other configurations known in the art for providing semi-submersible platforms may be utilized in combination with the features of the present invention. Thus, the exemplary structure of the semi-submersible platform illustrated in the figures should not be construed as limiting the structure of the present invention.

D. Upper and Lower Decks

The service station 10 of the present invention will generally include an upper deck 20 and a lower deck 40. Various components of the present invention will be positioned within the interior of the upper and lower decks 20, 40. It should be appreciated that configurations and arrangements may vary for different applications of the present invention. Thus, the present invention should not be construed as being limited to the exemplary configuration shown in the figures and described herein. Specifically, it is appreciated that components which are shown being positioned within the upper deck 20 may be positioned in the lower deck 40 in certain embodiments, and vice versa. Further, it is appreciated that, in some embodiments, the present invention may be comprised of only a single deck.

The upper deck 20 of the station 10 will generally include a roof 21 having a plurality of fans 22 positioned thereon. The roof 21 will preferably be comprised of a dark or black material and color which is known to absorb sunlight. Solar heat collected by the roof 21 will be utilized in conjunction with the third heater assembly 70 of the present invention. The fans 22 will collect ambient surrounding air which is utilized in conjunction with the first heater assembly 50 of the present invention.

Figure 2:
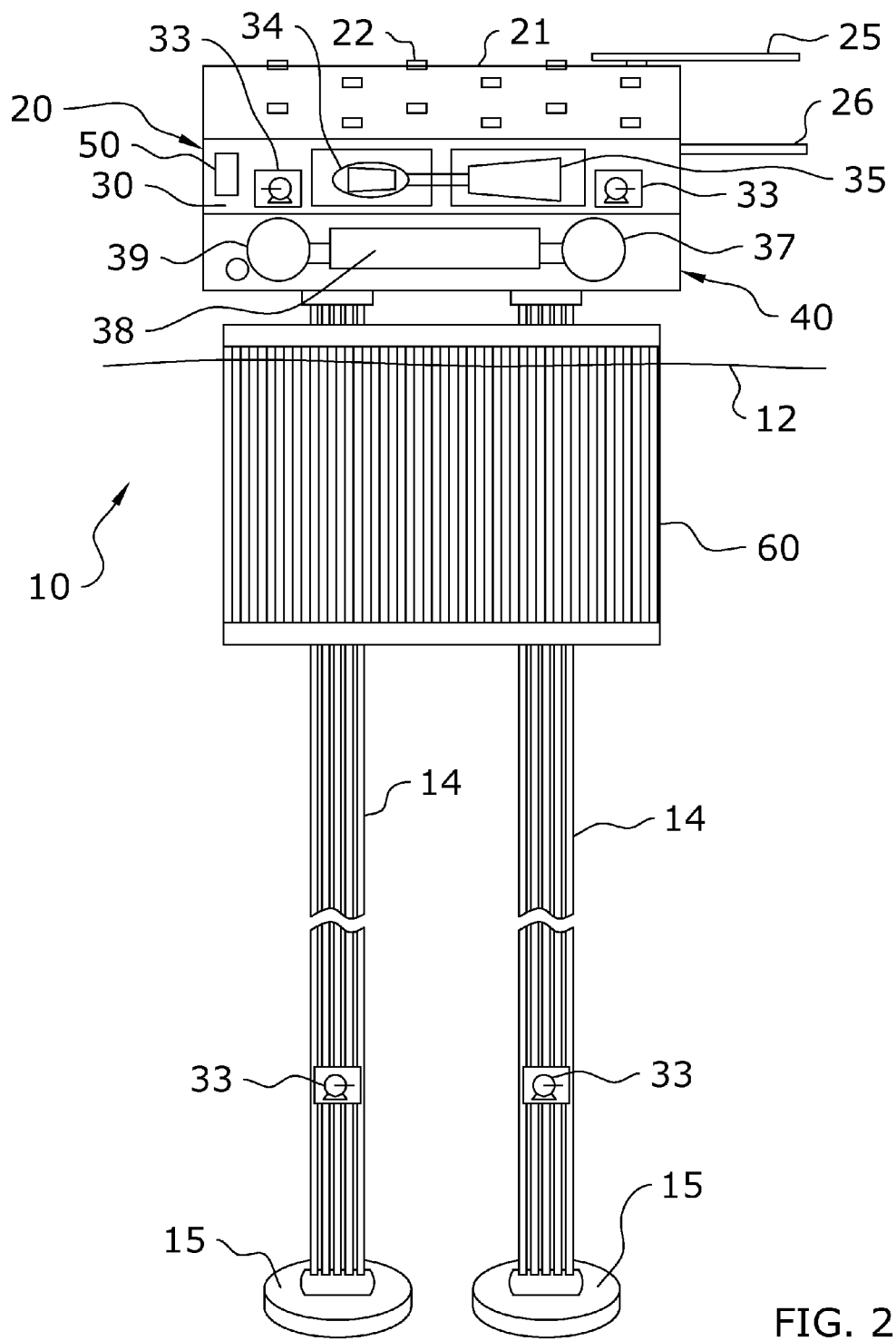
FIG. 2 is a front sectional view of the present invention.
Figure 3:
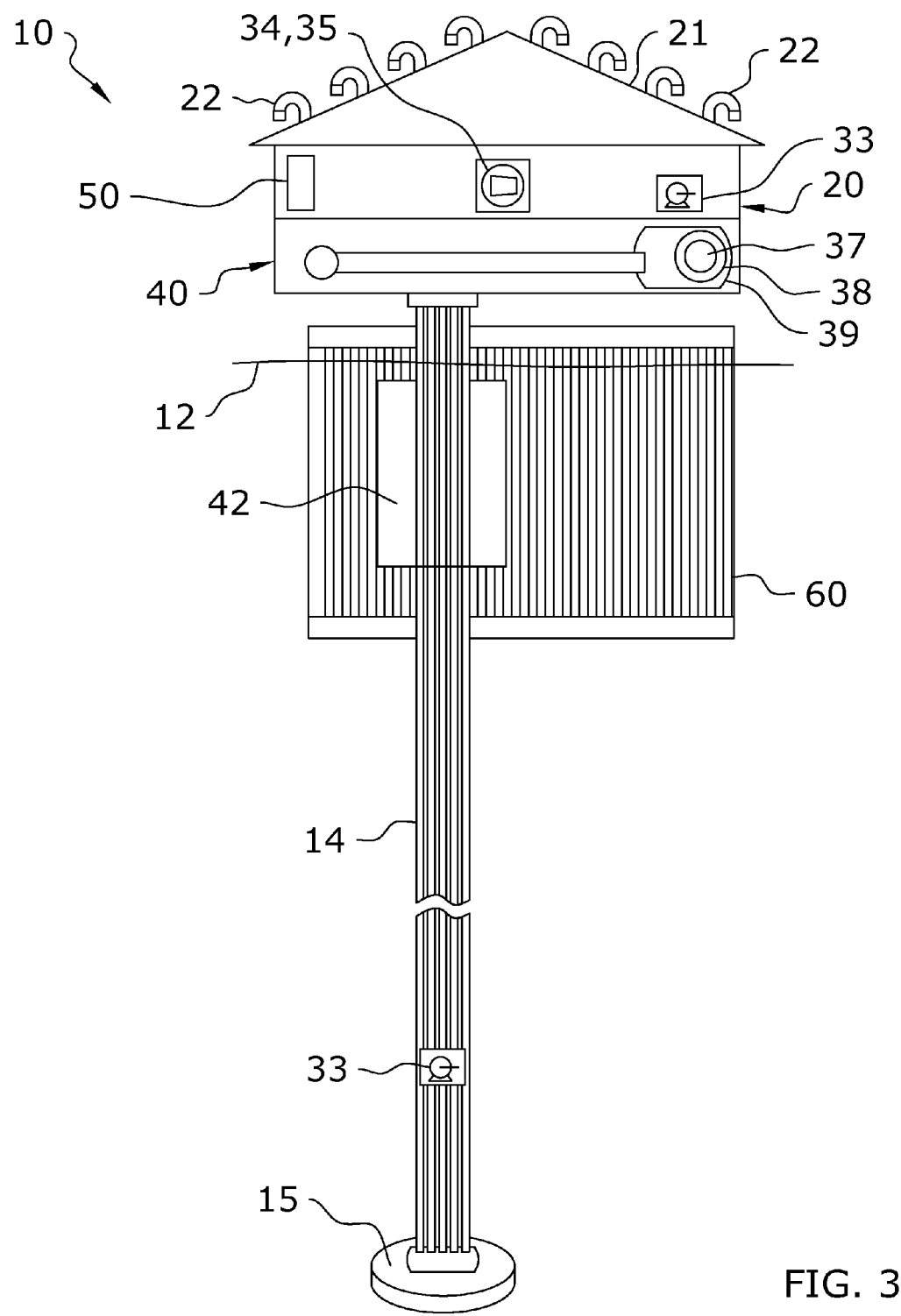
FIG. 3 is a side sectional view of the present invention.
Figure 4:
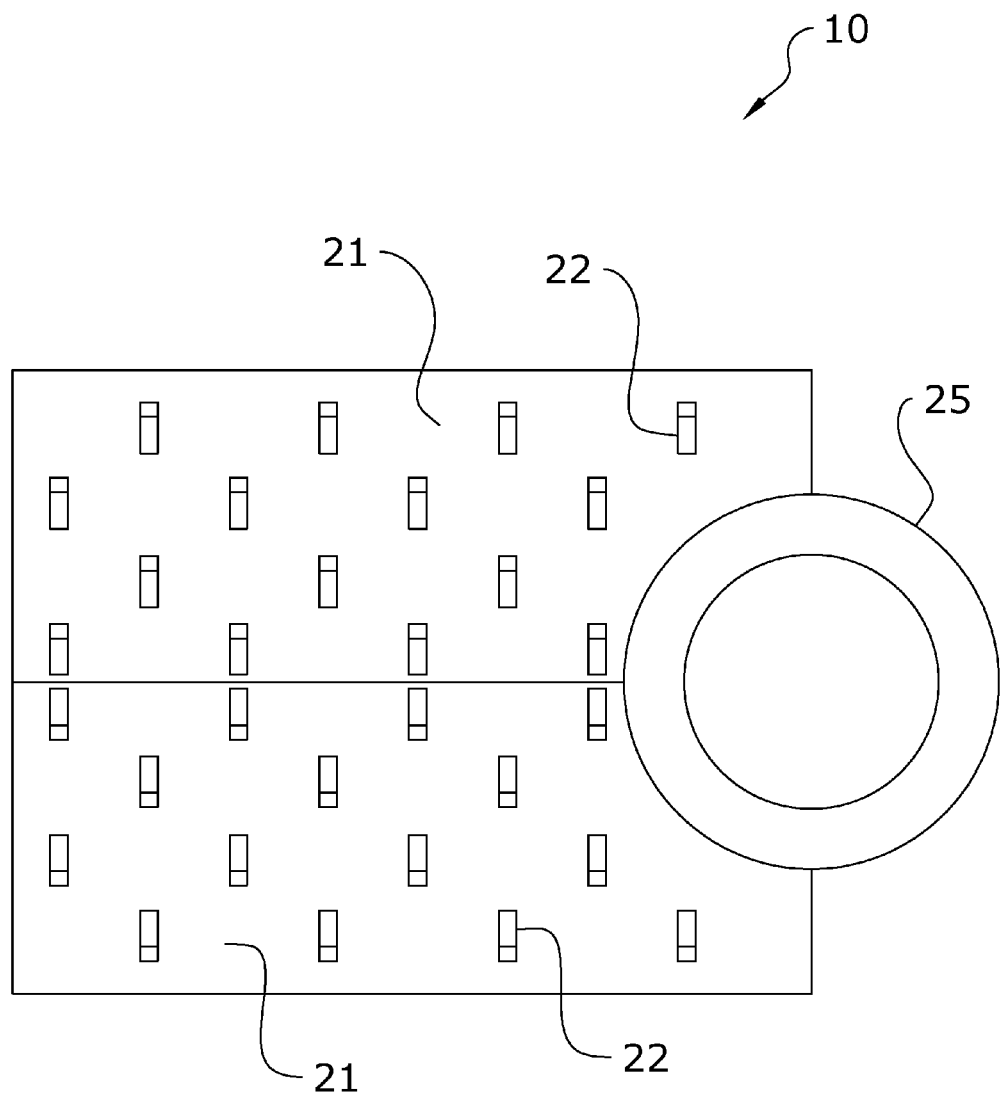
FIG. 4 is a top view of the present invention.

As shown in FIG. 2, the upper deck 20 of the station 10 may also include a helipad 25 for easing transfer of supplies and personnel between the station 10 and shore. Further, the upper deck 20 of the station 10 may also include a crane 26 to ease servicing of the various components of the present invention.

The upper deck 20 will generally include an interior 30 which houses the offices, control stations and the like of the present invention (not shown). The interior of the upper deck 20 of the present invention also generally houses the pumps 33, generators 34, turbines 35 and other components of the station 10.

Figure 5:
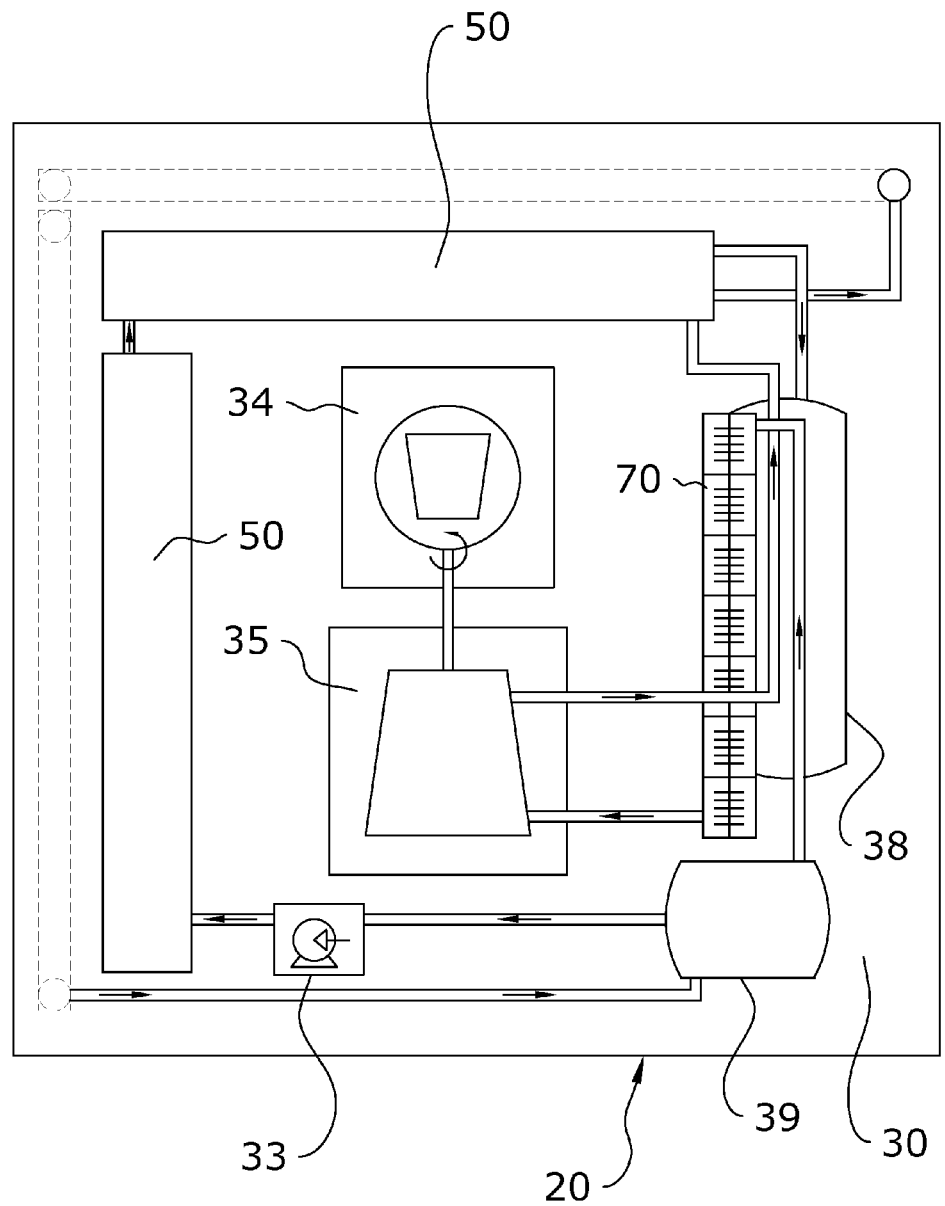
FIG. 5 is a top sectional view of the upper deck of the present invention.

The interior 30 of the upper deck 20 of the station 10 is illustrated in FIG. 5. As shown therein, the interior 30 of the upper deck 20 of the station 10 will generally include one or more fluid pumps 33, generators 34 and turbines 35 for use with the present invention. The fluid pumps 33 are utilized to transfer the working fluid of the present invention through its cycle. The pumps 33 may be comprised of various types of pumps known in the art, including positive displacement pumps, rotary pumps, centrifugal pumps and the like. The specifications of the pumps 33, such as horsepower, flow and delivery pressures, may vary depending on the power generation parameters and working fluid characteristics of the particular application of the present invention.

The generators 34 and turbines 35 of the present invention are utilized to generate electricity which may then be transferred elsewhere, such as to a power grid. Turbines 35 utilized with the present invention may be comprised of various types of conventional turbines known in the art. Each turbine 35 will receive hot, pressurized working fluid vapor and turn an output shaft as the vapor expands. The specifications of each turbine 35, including horsepower, operating pressures, vane configuration and style/number of turbine stages will vary for different applications of the present invention.

The generators 34 used by the present invention will be connected to the turbines 35 to generate electrical power. The turning of the output shaft of each turbine 35 will turn the generator's 34 input shaft to generate electricity. Various types of generators 34 may be utilized with the present invention. It is appreciated that the specifications of the generators 34 use with the present invention may vary depending on the application of the present invention.

Figure 6:
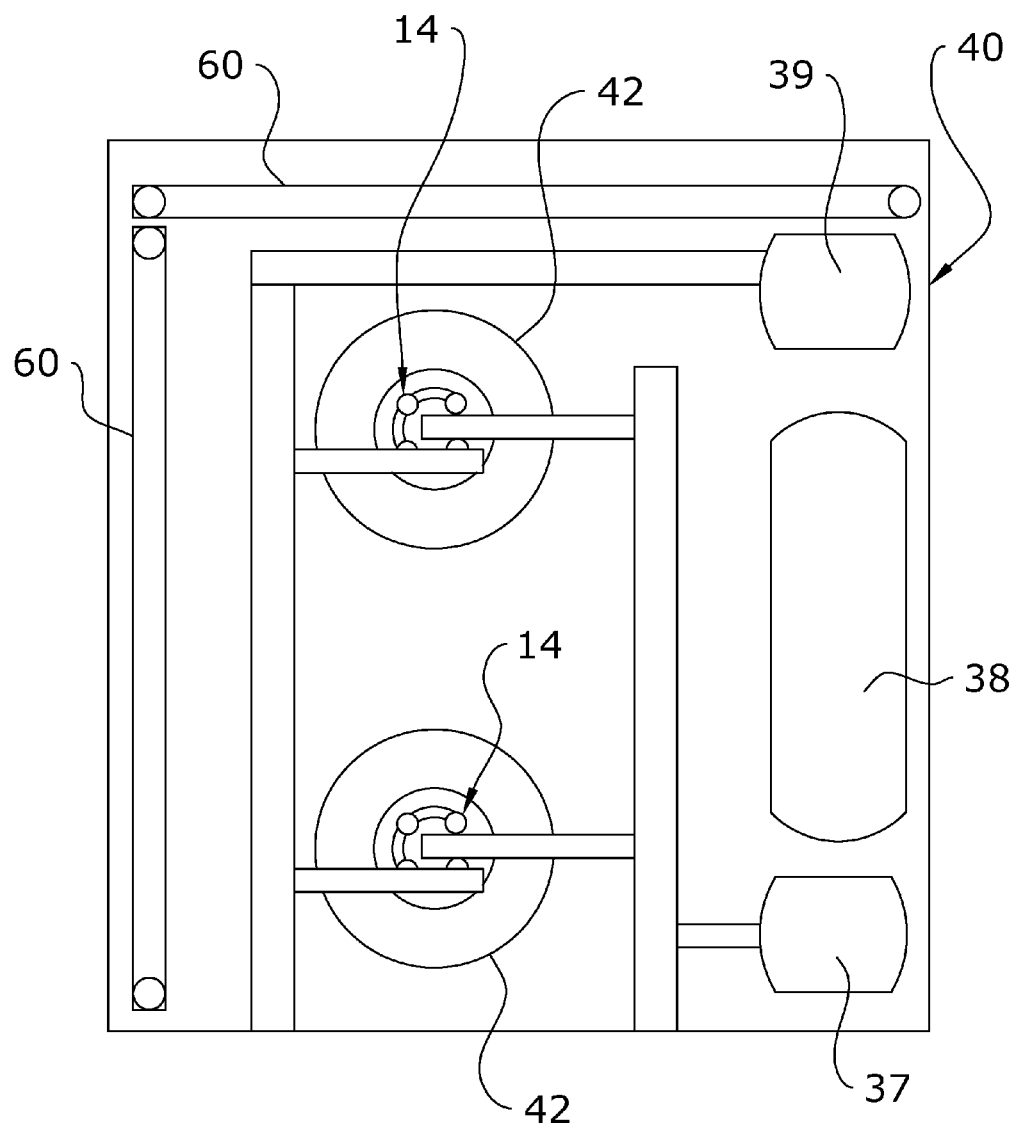
FIG. 6 is a top sectional view of the lower deck of the present invention.
Figure 7:
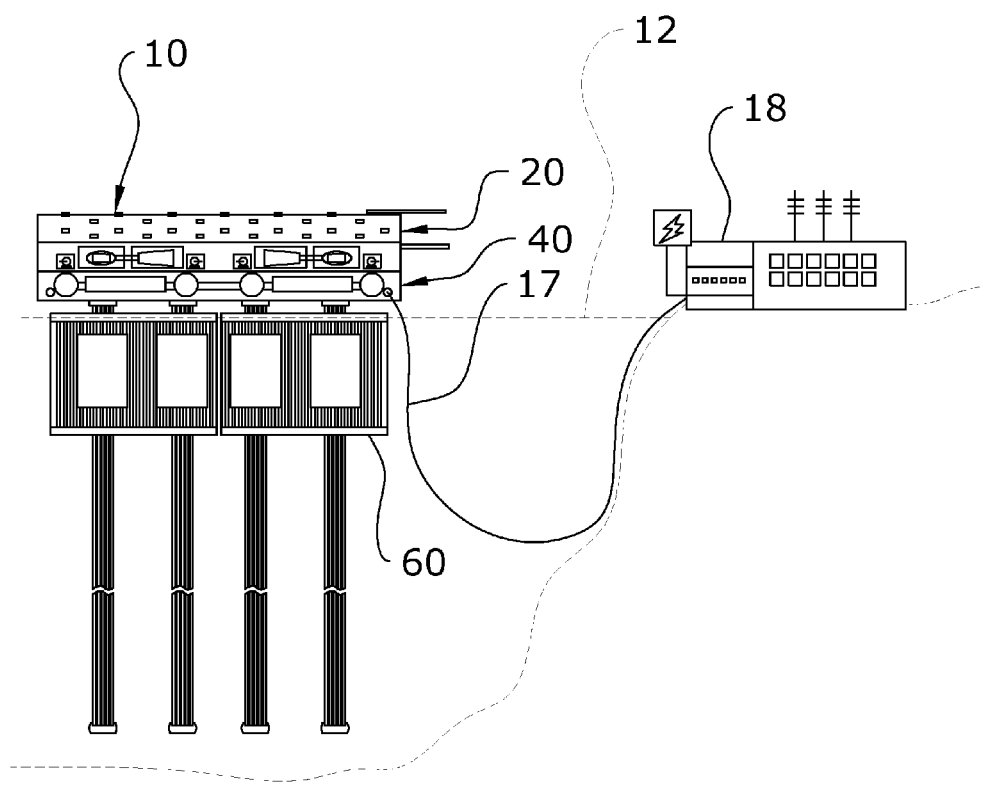
FIG. 7 is a front view of an alternate embodiment of the present invention distributing power to a power facility.

The interior of the lower deck 40 of the station 10 is illustrated in FIG. 6. The lower deck 40 will generally store the working fluid tanks 37, water storage tanks 38 and spent working fluid tanks 39 of the present invention. The working fluid tanks 37 act to store the working fluid 37 of the present invention prior to the working fluid 37 being transferred through the third heater assembly 70 and into the turbine 35. The water storage tanks 38 are utilized to store potable water which is generated by the present invention. The spent working fluid tanks 39 are utilized to store the spent working fluid prior to its entry into the heat exchanger 14.

E. Buoyancy Tanks

Figure 8:
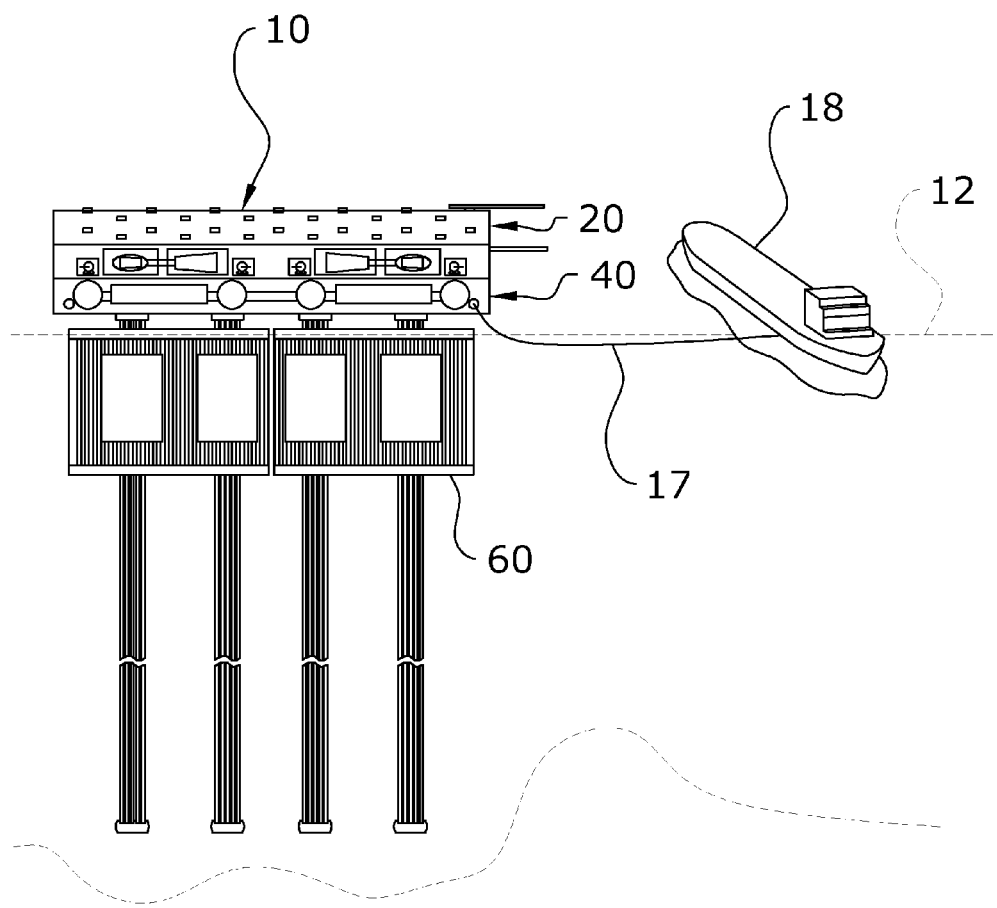
FIG. 8 is a front view of an alternate embodiment of the present invention distributing power to a power facility.
Figure 9:
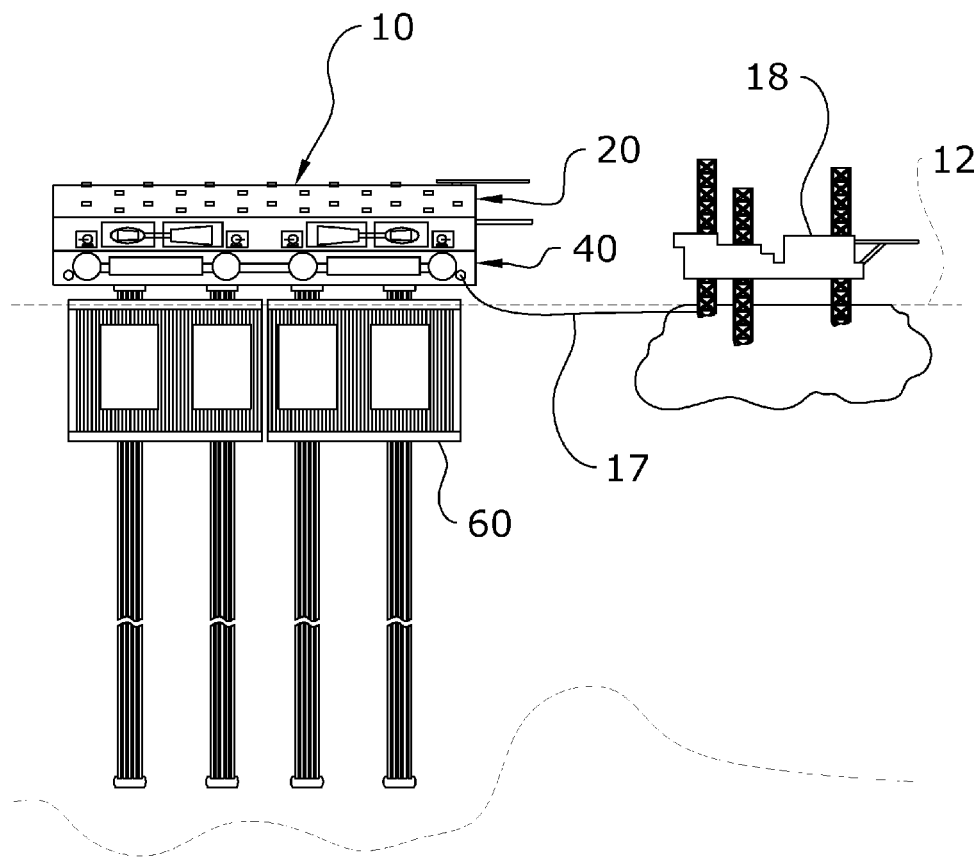
FIG. 9 is a front view of an alternate embodiment of the present invention distributing power to a power facility.
Figure 10:
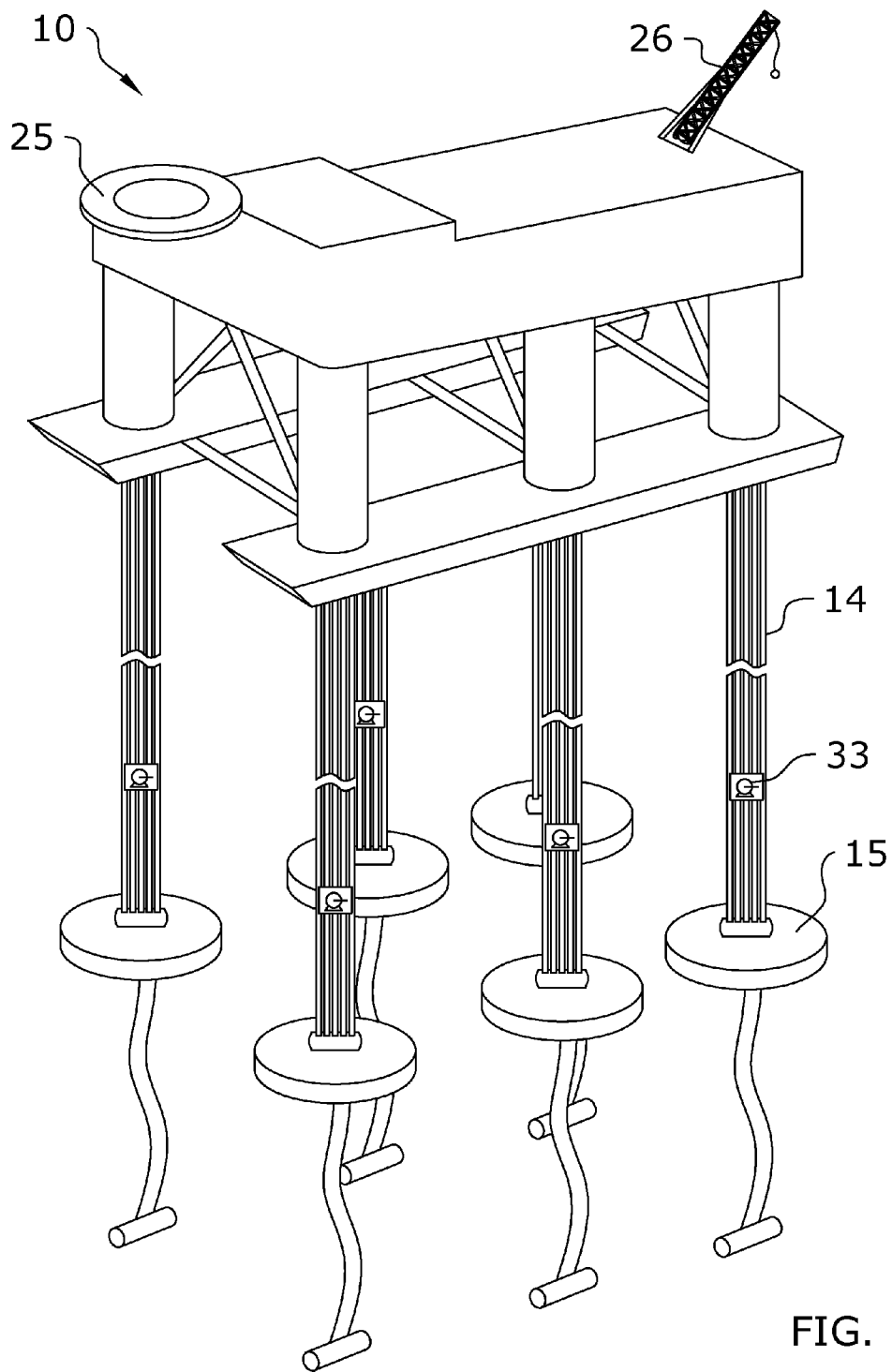
FIG. 10 is an upper perspective view of an alternate embodiment of the present invention.

The station 10 of the present invention will generally include one or more buoyancy tanks 42 which assist with keeping the station 10 buoyant. One or more cables may also be secured at one end to the station 10 and at the other end to the ocean floor to ensure that the station 10 will not drift. Each of the buoyancy tanks 42 will generally be surround a portion of the heat exchanger(s) 14 adjacent its upper end and be surrounded by the third heater assembly 70 of the present invention as shown in FIG. 8.

F. Heater Assemblies

The present invention will generally make use of three heater assemblies 50, 60, 70 for providing heat at various stages of the energy production cycle. A first heater assembly 50 works by utilizing the warm, ambient air surrounding the station 10 to heat working fluid. The first heater assembly 50 condenses and collects potable water, which is delivered to the water storage tanks 38 on the upper deck 20.

As shown in FIG. 1, the first heater assembly 50 is generally positioned in the cycle of the present invention after the heat exchanger 14. The first heater assembly 50 utilizes warm, ambient air which is collected via the fans 22 on the roof 21 of the station 10. Warm air is drawn in through the fans and then applied to the working fluid of the present invention to heat the working fluid. In a preferred embodiment, the first heater assembly 50 will be positioned within the upper deck 20 of the present invention as shown in FIG. 5.

The second heater assembly 60 utilizes the warm ocean temperatures to heat the working fluid further after it has passed through the first heater assembly 50. As shown in FIG. 1, the second heater assembly 60 will generally be comprised of a tank or a grid of conduits which are not insulated and are positioned directly underneath the ocean surface 12. The heat of the warm ocean water will act to heat the working fluid further before it is transferred to the third heater assembly 70.

The third heater assembly 70 utilizes solar warmth collected by the black or dark surface of the roof 21. Water is run across the roof 21 and acts to absorb the collected solar heat thereon. The heat of the water is then exchanged with the working fluid just prior to the working fluid being directed into the turbine 35.

G. Alternate Embodiments

While FIGS. 1-6 illustrate a station 10 which utilizes only a single cycle, it is appreciated that additional cycles may be accommodated in a single station 10 to increase power production. FIGS. 7-10 illustrate an exemplary embodiment of the present invention which accommodates four discrete cycles to increase power generation. It is appreciated that more or less cycles may be accommodated by the present invention to suit different applications.

H. Power Transfer

Power generated by the present invention may be transferred to a power facility 18 such as an on-shore power plant, off-shore power plant or a carrier vessel through use of a transfer member 17. It is appreciated that the present invention may be utilized to provide power for various types of facilities, both on-shore and off-shore, and thus should not be construed as being limited by the exemplary configurations shown in the figures.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. An OTEC service station, comprising:
a semi-submersible platform including a high efficiency OTEC system, said high efficiency OTEC system comprising:
   a fluid transfer assembly for cooling and condensing a working fluid, wherein said fluid transfer assembly extends from said semi-submersible platform;
   a pump in fluid connection with said fluid transfer assembly for pressurizing said working fluid;
   a first heater in fluid connection with said pump for vaporizing said working fluid;
   a second heater positioned between said pump and said first heater, said second heater comprising an air/fluid heat exchanger;
   a fan adapted to blow warm air across said second heater;
   a collection receptacle positioned underneath said second heater to collect condensed moisture from said warm air for generating potable water;

a turbine in fluid connection with said first heater for expanding said working fluid; and a generator connected to said turbine for generating electrical power.

2. The OTEC service station of claim 1, wherein said semi-submersible platform includes a transfer member for providing power is connected to a power facility via a transfer member for providing power to said power facility.

3. The OTEC service station of claim 1, further comprising a third heater fluidly connected with said second heater for further heating of said working fluid.

4. The OTEC service station of claim 1, wherein said second heater comprises a solar-absorbent surface.

5. The OTEC service station of claim 4, wherein said fan is positioned on said solar-absorbent surface.

6. The OTEC service station of claim 5, wherein said semi-submersible platform further includes a roof, and said solar-absorbent surface is disposed on said roof.

7. The OTEC service station of claim 1, wherein said semi-submersible platform includes an upper deck, a lower deck, and a solar-absorbent roof.

8. The OTEC service station of claim 7, wherein said upper deck includes a helipad.

9. The OTEC service station of claim 8, wherein said fan is positioned on said roof.

10. The OTEC service station of claim 7, wherein said fluid transfer assembly extends from said lower deck.

11. The OTEC service station of claim 10, wherein said pump is housed within said upper deck.

12. The OTEC service station of claim 11, wherein said generator and said turbine are housed within said upper deck.

13. The OTEC service station of claim 1, further comprising at least one buoyancy tank.

14. The OTEC service station of claim 13, wherein said at least one buoyancy tanks at least partially surrounds said fluid transfer assembly.

\* \* \* \* \*